Patented Sept. 11, 1934                                                1,973,023

UNITED STATES PATENT OFFICE 1,973,023

CONDENSATION PRODUCT OF AMINO-SUBSTITUTED ARSENO COMPOUNDS

Karl Streitwolf, Frankfort-on-the-Main, Alfred Fehrle, Bad Soden-on-the-Taunus, and Paul Fritzsche and Walter Herrmann, Frankfort-on-the-Main, Germany, assignors to Winthrop Chemical Company, Inc., New York, N. Y., a corporation of New York No Drawing. Application August 15, 1931, Serial No. 557,428. In Germany September 20, 1930

1 Claim.  (Cl. 260—15)

The present invention relates to condensation products of amino-substituted arseno compounds, more particularly to compounds of the following general formula $$NaO_2S-O-CH_2-HN-X-As=$$
$$As-X-(NH-CH_2-CHOH-CH_2-Y)_n$$

wherein X stands for a radical of the group consisting of benzene and phenyl-pyrazolone which radicals may be further substituted, wherein Y stands for H or OH, and $n$ may be 1 or 2.

We have found that compounds of the above constitution can be obtained by causing alkylene oxides, for instance glycide or propylene-oxide, and formaldehyde-bisulfite to react simultaneously or in succession in either order with amino-substituted arseno compounds containing at least two amino groups.

The process is preferably carried out by dissolving a salt, e. g. the hydrochloride of the arseno compound in water and separating the free base from the solution by addition of sodium carbonate and filtration. The base is preferably washed out. After suspending the free base in an organic solvent, preferably in methyl alcohol, there is added the alkylene-oxide while heating. After cooling and, if necessary, filtering the solution thus obtained, hydrochloric acid and a solution of sodium bisulfite and then a solution of formaldehyde are added. The reaction is finished, when the solution gives no longer a diazo-reaction, i. e. when no more free amino-groups are contained in the arseno compound. It may be advantageous to add after the addition of the solution of formaldehyde a further quantity of the sodium bisulfite solution. The solution thus obtained is neutralized, for instance, by adding caustic soda solution. From the neutralized solution the new product is separated by pouring the solution into alcohol which contains a small amount, e. g. about 10%, of ether. The precipitate hereby produced is filtered and can be dried, e. g. in a vacuum.

The new compounds are useful therapeutics which, on account of their tolerability when perorally administered and their excellent action on dysenteric amœbæ, are very well suitable for treating amœbic dysentery.

The hydroxyalkylamino-group being present in the new compounds is, if required, appropriated for introducing bismuth into the molecule.

The following examples serves to illustrate the invention, but they are not intended to limit it thereto.

(1) From a solution of 32 grams of the hydrochloride of 4'-arseno-di-(1-phenyl-2.3-dimethyl-4-amino-5-pyrazolone) in 640 cc. of water the base is precipitated by means of sodium carbonate solution. After filtering by suction and washing the base is caused at 60° C.–65° C. to react in 80 cc. of methyl alcohol with 5 grams of glycide

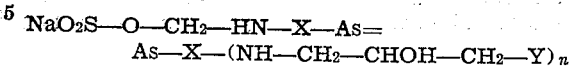

To the solution thus obtained and cooled to room temperature 50 cc. of 2-N-hydrochloric acid are added and then 12 cc. of sodium bisulfite (39%) are added, drop by drop. 4.7 cc. of formaldehyde solution of 30% strength are then added. As soon as the solution can no longer be diazotized, it is neutralized and filtered.

The filtrate is introduced, while stirring, into 10 parts of alcohol and 1 part of ether. The separated precipitate is filtered by suction. After washing out with alcohol and ether the compound is dried in a vacuum; it is brownish-yellow and dissolves in water to a clear solution. The solution has a neutral reaction and can no longer be diazotized. The new compound has the following probable constitution:

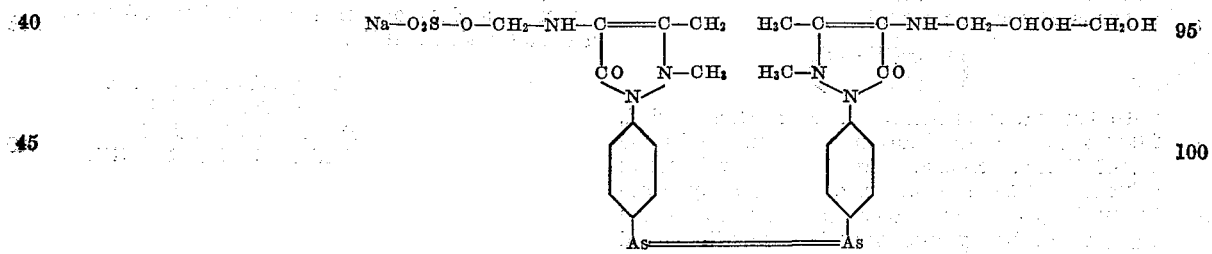

(2) 45 grams of 3.3'-diamino-4.4'-dihydroxyarsenobenzene-hydrochloride are stirred with 54 cc. of alcohol and dissolved by addition of 360 cc. of water. By addition of sodium carbonate the base is precipitated from the solution and filtered by suction. The washed base is caused at 60° C.–65° C. to react in 110 cc. of methyl alcohol with 10 grams of glycide. 100 cc. of 2-N-hydrochloric acid are added to the filtered solution thus obtained, 9.4 cc. of bisulfite solution are then introduced, drop by drop and then 9.4 cc. of formaldehyde solution are added. After stirring for a short time another 14.6 cc. of bisulfite solution are added and the whole is stirred until the solution can no longer be diazotized. After the solution has been neutralized, it is filtered and the filtrate is introduced, while stirring, into 10 parts of alcohol and 1 part of ether. The compound which separates is filtered by suction and is dried in a vacuum. It dissolves in water to a clear solution and has the following probable constitution:

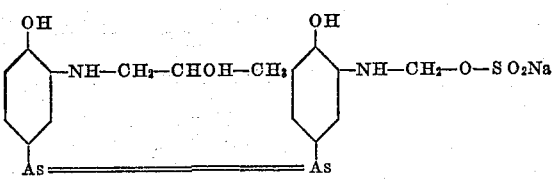

(3) 22.5 grams of 3.3′-diamino-4.4′-dihydroxy-arsenobenzene-hydrochloride are, as indicated in Example 2, transformed into the base which is dispersed in 55 cc. of methyl alcohol and heated in a closed vessel to 60° C.–65° C. with 4 grams of propylene oxide

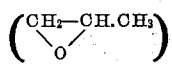

until the whole is dissolved. It is then cooled, filtered to a clear solution and mixed with 50 cc. of N-hydrochloric acid. 4.7 cc. of bisulfite solution (39%) and 4.7 cc. of formaldehyde solution (30%) are introduced drop by drop, while vigorously stirring, and the whole is still stirred for 5 minutes. Then 7.3 cc. of bisulfite solution are introduced drop by drop and the whole is stirred for 4 hours. The solution which can no longer be diazotized is neutralized with caustic soda solution, poured into 10 times its quantity of alcohol which is mixed with 10% of ether, the precipitate is filtered by suction and washed with a mixture of alcohol and ether and then with ether. The compound which has been dried in a vacuum is a yellow powder, which dissolves in water to a clear solution having a neutral reaction. It probably has the following constitution:

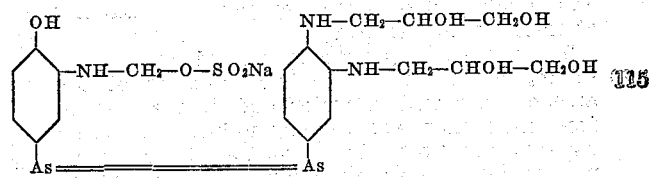

(4) 18.5 grams of 3.3′.4′-triamino-4-hydroxy-arsenobenzene, prepared by reducing 3-amino-4-hydroxybenzenearsonic acid with 3.4-diaminobenzenearsonic acid, are heated to 60° C.–65° C. in 80 cc. of methyl alcohol with 10 grams of glycide until dissolution has occurred; it is then caused to react with formaldehyde and sodium bisulfite as indicated in the preceding examples and the product is precipitated with alcohol and ether. The compound is a yellow powder which dissolves in water with a neutral reaction. It probably has the following constitution:

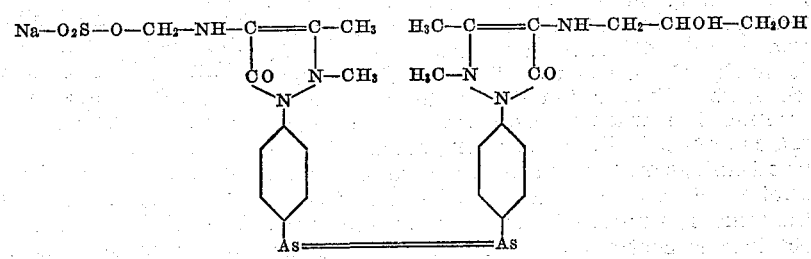

We claim:
The compound of the following formula being a yellow brownish substance, soluble in water to a clear and neutral solution and being a valuable therapeutic.

KARL STREITWOLF.
ALFRED FEHRLE.
PAUL FRITZSCHE.
WALTER HERRMANN.